(12) United States Patent
Mamdani et al.

(10) Patent No.: US 11,037,108 B2
(45) Date of Patent: *Jun. 15, 2021

(54) METHOD AND SYSTEM FOR FACILITATION OF WIRELESS E-COMMERCE TRANSACTIONS

(71) Applicant: Aeritas, LLC, Dallas, TX (US)

(72) Inventors: Malik Mamdani, Dallas, TX (US); Curtis Grant, Flower Mound, TX (US); Patrick Johnson, Trophy Club, TX (US); Kevin Bomar, Weatherford, TX (US); Tim Whatley, Irving, TX (US)

(73) Assignee: Aeritas, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/723,601

(22) Filed: Oct. 3, 2017

(65) Prior Publication Data

US 2019/0073642 A1 Mar. 7, 2019

Related U.S. Application Data

(63) Continuation of application No. 13/093,135, filed on Apr. 25, 2011, now Pat. No. 9,779,391, which is a
(Continued)

(51) Int. Cl.
*G06Q 20/04* (2012.01)
*H04W 12/06* (2021.01)
(Continued)

(52) U.S. Cl.
CPC ............ *G06Q 20/04* (2013.01); *G06Q 20/12* (2013.01); *G06Q 20/32* (2013.01); *G06Q 20/322* (2013.01);
(Continued)

(58) Field of Classification Search
CPC . G06F 17/60; H04L 9/00; H04L 67/02; H04L 63/0861; H04L 2463/102; G06Q 10/02; G06Q 30/02; G06Q 20/00; G06Q 30/00; G06Q 20/04; G06Q 20/32; G06Q 20/322; G06Q 20/3274; G06Q 20/385; G06Q 20/401; G06Q 20/4014;
(Continued)

(56) References Cited

U.S. PATENT DOCUMENTS 6,260,027 B1 * 7/2001 Takahashi ............... G06Q 20/02
705/64
6,473,739 B1 * 10/2002 Showghi ................. G06Q 30/06
705/15

(Continued)

*Primary Examiner* — Khawar Iqbal
(74) *Attorney, Agent, or Firm* — David H. Judson

(57) ABSTRACT

A method for facilitating a wireless transaction includes receiving, by a transaction fulfillment system, a transaction request from a transaction requester and verifying an identity of the transaction requester. After verifying the identity of the transaction requester, a transaction code is communicated from the transaction fulfillment system to a wireless communication device. After receiving the transaction code, the transaction code is optically scanned from a visual display of the wireless communication device by the transaction fulfillment system.

6 Claims, 11 Drawing Sheets

Related U.S. Application Data continuation of application No. 09/690,213, filed on Oct. 17, 2000, now Pat. No. 7,933,589.

(60) Provisional application No. 60/217,997, filed on Jul. 13, 2000.

(51) Int. Cl.

| | |
|---|---|
| *G06Q 20/12* | (2012.01) |
| *G06Q 20/32* | (2012.01) |
| *G06Q 20/38* | (2012.01) |
| *G06Q 20/40* | (2012.01) |
| *G06Q 30/06* | (2012.01) |
| *H04L 29/06* | (2006.01) |
| *H04M 3/493* | (2006.01) |
| *H04L 29/08* | (2006.01) |

(52) U.S. Cl.
CPC ....... *G06Q 20/3274* (2013.01); *G06Q 20/385* (2013.01); *G06Q 20/401* (2013.01); *G06Q 20/4014* (2013.01); *G06Q 30/06* (2013.01); *G06Q 30/0601* (2013.01); *H04L 63/0861* (2013.01); *H04L 67/02* (2013.01); *H04M 3/4938* (2013.01); *H04W 12/06* (2013.01); *H04L 2463/102* (2013.01); *H04M 2203/105* (2013.01); *H04M 2203/353* (2013.01); *H04M 2207/18* (2013.01)

(58) Field of Classification Search
CPC .... G06Q 30/06; G06Q 30/0601; G06Q 20/12; G06K 5/00; H04Q 7/32; G07F 7/08; H04M 3/4938; H04M 2203/105; H04M 2203/353; H04W 12/06
See application file for complete search history.

(56) References Cited

U.S. PATENT DOCUMENTS

| | | | |
|---|---|---|---|
| 6,525,835 B1* | 2/2003 | Gulati | G07B 17/00508 235/462.01 |
| 6,584,309 B1* | 6/2003 | Whigham | G07F 9/02 455/414.1 |
| 6,847,816 B1* | 1/2005 | Sarradin | G06Q 20/322 455/407 |
| 7,930,216 B2* | 4/2011 | Neofytides | G06Q 20/02 705/26.41 |
| 2003/0055735 A1* | 3/2003 | Cameron | G06Q 20/327 705/27.1 |
| 2005/0017068 A1* | 1/2005 | Zalewski | G06Q 20/3552 235/380 |
| 2008/0097855 A1* | 4/2008 | Rissanen | G06Q 20/327 705/14.64 |
| 2008/0228600 A1* | 9/2008 | Treyz | H04W 4/24 705/26.43 |
| 2009/0125429 A1* | 5/2009 | Takayama | G06Q 20/04 705/35 |
| 2009/0222358 A1* | 9/2009 | Bednarek | G06Q 30/0207 705/26.1 |
| 2010/0106574 A1* | 4/2010 | Cartwright | G06Q 30/0209 705/14.7 |
| 2015/0332177 A1* | 11/2015 | Ritter | G07F 7/0866 705/5 |
| 2015/0347930 A1* | 12/2015 | Cohen | G06Q 10/02 705/5 |

* cited by examiner

METHOD AND SYSTEM FOR FACILITATION OF WIRELESS E-COMMERCE TRANSACTIONS

BACKGROUND

The disclosures herein relate generally to mobile electronic commerce, and more particularly to methods and systems for facilitation of wireless e-commerce transactions.

Mobile e-commerce is expected to grow at a tremendous rate. The sheer scale of the opportunity is impressive. The number of Internet-enabled mobile devices is expected to exceed the number of PCs by 2003. It is predicted that by 2004 the majority of e-commerce purchases will be made though wireless communication devices.

With the convergence of location information and wireless access to the Internet, users of wireless communication devices will be able to receive product offerings relevant to their location and interests. This will open up a whole new method for targeting customers with advertising. A key area of interest in wireless e-commerce is the communication of targeted ads to the wireless devices. However, to take full advantage of wireless e-commerce, users will need to be in a position to act on such advertisements in a real time manner. This will require that transactions to be made using a wireless communication device in concert with receiving an advertisement for a product or service.

There are several barriers, however, that must be overcome to make such wireless e-commerce transactions commonplace. One such barrier to wireless transactions being widely accepted is security. For wireless transactions to be embraced, systems must be in place for preventing unauthorized purchases on a user's wireless account. Such security measures are even more important in the case of a wireless communication device, due to situations such as the wireless communication device being lost or stolen. Because wireless communication devices are significantly less secure than non-portable communication devices, steps must be taken to provide an elevated degree of security. However, present e-commerce security solutions are limited in their ability to provide effective and efficient solutions for facilitating secured wireless e-commerce transactions.

Another barrier that must be overcome to make wireless e-commerce transactions commonplace is tying e-commerce transactions to "real world" products and services. For example, if an authorized user of a wireless communication device purchases a movie ticket for a show at a particular theater using her wireless communication device, systems must be in place for notifying the theater that the ticket has been purchased by an authorized user. Furthermore, systems must be in place for permitting the authorized user of the wireless communication device to obtain entry to the theater and the show once at the theater.

Present solutions for tying e-commerce transactions to real world products are inconvenient and time-consuming. As a result, they offset much of the convenience of facilitating a wireless e-commerce transaction. For example, one present solution for tying an e-commerce transaction to a corresponding real word product requires that a printed confirmation, such as a receipt, pass or ticket, be printed out on a printer. Such a solution requires that the printed confirmation be generated at a physical location. The printed confirmations often include non-standardized barcodes that are processed at the merchant's location. Typically, the printed confirmation needs to be generated at a location different than the location where the wireless e-commerce transaction is performed.

Accordingly, what is needed is a method for enabling wireless e-commerce transactions to be facilitated and fulfilled in a secure and convenient manner.

SUMMARY

One embodiment of a method for facilitating a wireless transaction includes communicating a first transaction code to a wireless communication device and optically scanning, by a transaction fulfillment system, the first transaction code from a visual display of the wireless communication device.

DETAILED DESCRIPTION

Figure 1:
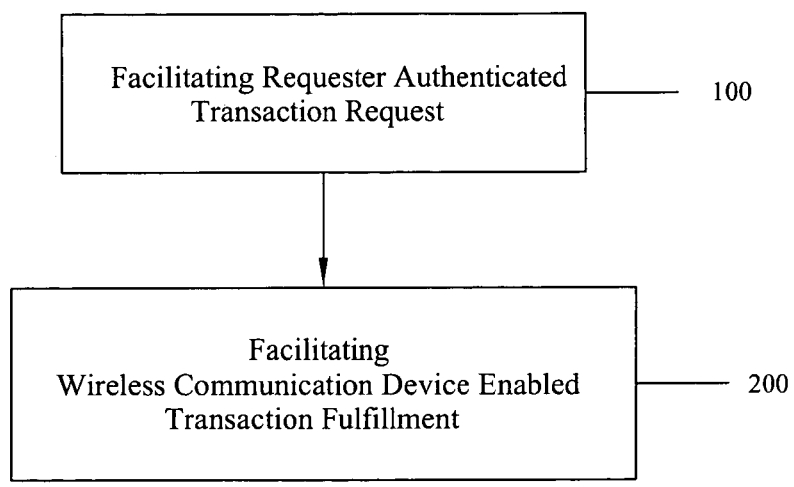
FIG. 1 is a flowchart illustrating an embodiment of a method for facilitating a wireless transaction.

An embodiment of a method for facilitating a wireless transaction is illustrated in FIG. 1. At a box 100, the method includes an operation of facilitating a requester authenticated transaction request. At a box 200, the method includes an operation of facilitating wireless communication device enabled transaction fulfillment.

By wireless transaction, it is meant that the transaction is requested and fulfilled through the use of a wireless communication device. By wireless communication device enabled transaction fulfillment, it is meant that the wireless communication device is used for facilitating fulfillment of the actual products or services requested. Internet enabled wireless telephones, Internet enabled wireless personal digital assistants (wPDA's) and wireless enabled laptop computers illustrate examples of suitable wireless communication devices capable of connecting with and communicating through a computer network system, such as the Internet. Broadly speaking, the wireless communication devices discussed herein are wireless communication devices capable of accessing a public computer network, a private computer network or both.

As described below in greater detail, an apparatus for facilitating the methods and operations disclosed herein may include functional systems, such as a transaction management system and a transaction fulfillment system. The transaction requester utilizes a wireless communication device for communicating information to and from the transaction management system and the transaction fulfillment system.

Two or more of the functional systems of the apparatus, such as the transaction management system and the transaction fulfillment system, may be located at a remote location from each other. However, in some applications, it may be advantageous for the functional systems to be located at the same physical location. In these applications, it may also be advantageous for a single integrated hardware system comprising the transaction management system and the transaction fulfillment system.

The portability of wireless communication devices requires that sufficient security measures be in place to insure that the transaction requester is an authorized user of the wireless communication device. The intent of such security measures is to insure that an unauthorized user of the wireless communication device cannot facilitate a transaction using the wireless communication device. Accordingly, it is advantageous that the method for facilitating the wireless transaction includes an operation for verifying that the transaction requester is an authorized user of the wireless communication device.

Figure 2:
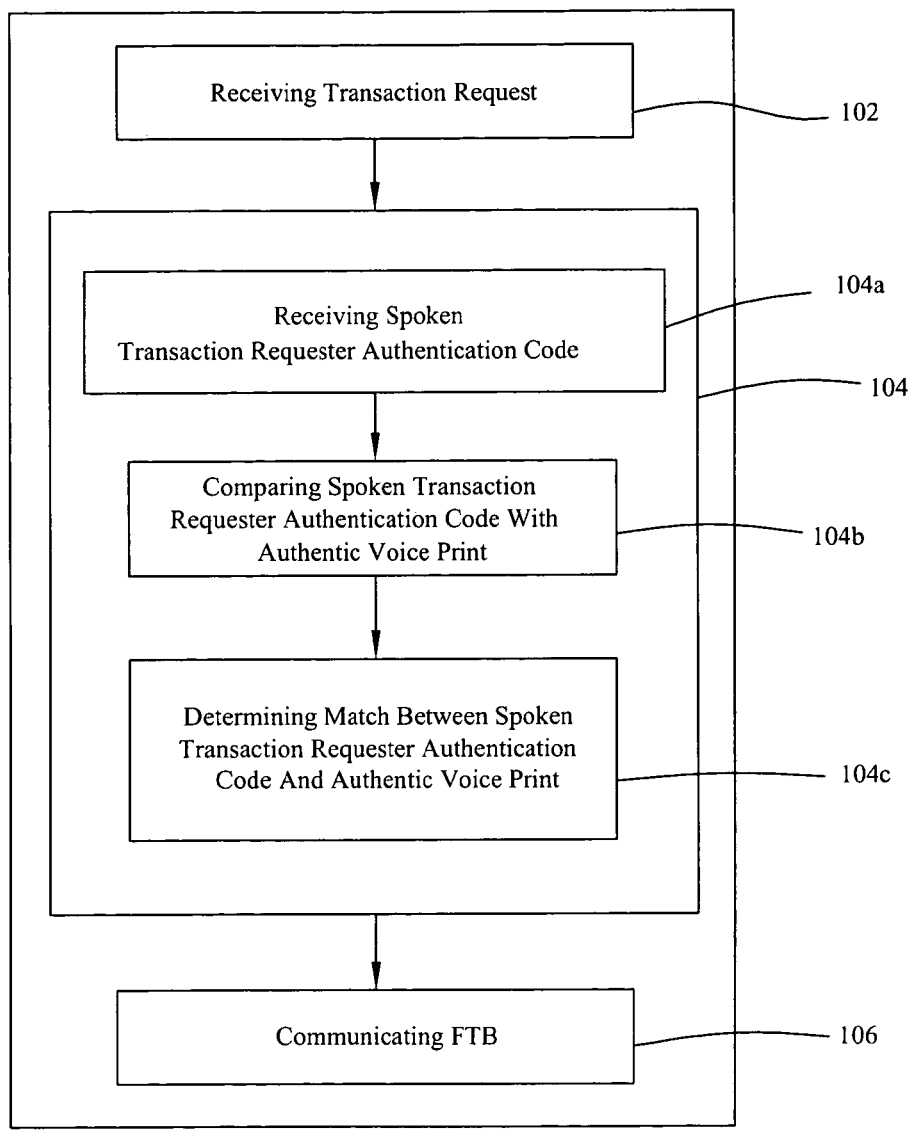
FIG. 2 is a flowchart illustrating an embodiment of a method for facilitating authentication of a spoken authentication code of a transaction requester.

An embodiment of a method for performing the operation of facilitating the requester authenticated transaction request, the box 100 in FIG. 1, is illustrated in FIG. 2. At a box 102, the method includes receiving, at the transaction management system, a transaction request from a wired or a wireless communication device of a transaction requester. At a box 104, the identity of the transaction requester is authenticated. At a box 106, a first transaction barcode (FTB) is communicated to the wireless communication device. Depending on the configuration of the system architecture employed for carrying out the method 100, the FTB may be communicated from the transaction management system or the transaction fulfillment system.

The FTB illustrates a first example of an optically scannable transaction code used to facilitate fulfillment of the transaction request. In subsequent operations disclosed herein, the FTB is displayed on a visual display of the wireless communication device for being optically scanned by a component of the transaction fulfillment system for enabling full or partial fulfillment of the transaction request.

Voice authentication illustrates one example of a suitable technique for performing the operation of verifying the identity of the transaction requester at the box 104. A method for performing the operation of voice authentication of the transaction requester includes receiving, at a box 104*a*, a spoken transaction requester authentication code. It is contemplated that the spoken authentication code can be received from a wired telephone or the wireless communication device. At a box 104*b*, an operation of comparing the spoken transaction requester authentication code is performed. At a box 104*c*, an operation is performed for determining a match between the spoken transaction requester authentication code and an authentic voice print for an authorized user of the wireless communication device.

An example of voice authentication includes the user of a wireless phone calling into a secure server and speaking their phone number. The spoken telephone number illustrates an example of the spoken transaction requester authentication code. The spoken telephone number is then compared to an authentic voice print of an authorized user of the wireless communication device. If the spoken transaction requester authentication code matches the authentic voice print, the transaction requester is permitted to continue with fulfillment of the transaction.

Figure 3A:
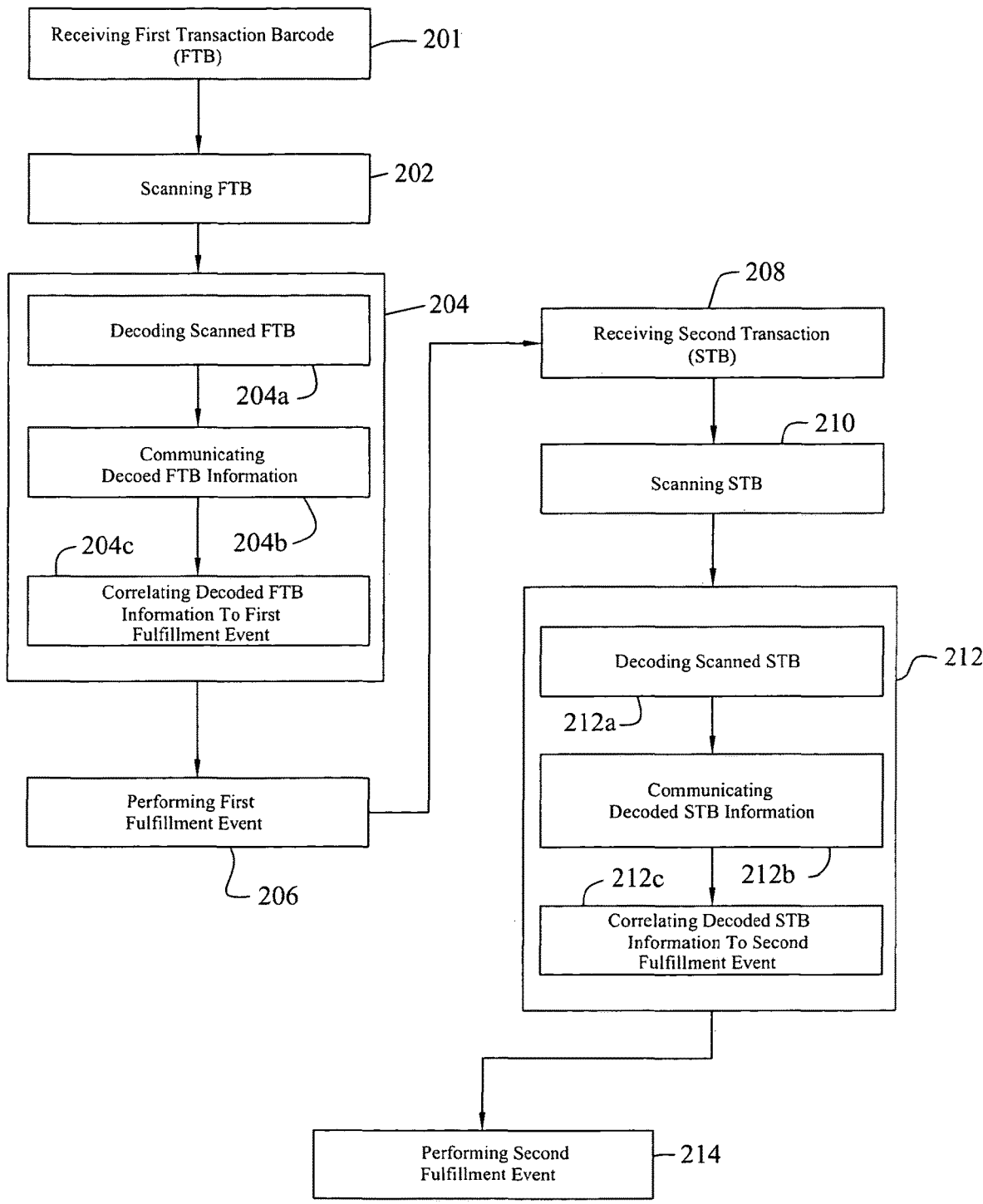
FIG. 3A is a flow chart illustrating an embodiment of a method for facilitating fulfillment of a wireless transaction, wherein transaction code verification is completed by a transaction management system.

An embodiment of a method for performing the operation of facilitating wireless communication device enabled transaction fulfillment, the box 200 in FIG. 1, is illustrated in FIG. 3A. The method for the embodiment illustrated in FIG. 3A is best suited for being facilitated by a system in which verification of transaction codes is performed at the transaction management system. At a box 201, the FTB is received by the wireless communication device. At a box 202, the FTB is scanned from the wireless communication device. At a box 204, the FTB is verified. Verifying the FTB includes decoding the scanned FTB at a box 204*a*, communicating the decoded FTB to the transaction management system at a box 204*b* and correlating the decoded FTB to a first transaction fulfillment event at a box 204*c*. At a box 206, the first transaction fulfillment event is performed.

At a box 208, a second transaction barcode (STB) is received by the wireless communication device. At a box 210, the STB is scanned from the wireless communication device. At a box 212, the STB is verified. Verifying the STB includes decoding the scanned STB at a box 212*a*, communicating the decoded STB to the transaction management system at a box 212*b* and correlating the decoded STB to a first transaction fulfillment event at a box 212*c*. At a box 214, the second transaction fulfillment event is performed.

The first and second fulfillment events may be physical events or informational events. Activating a turnstile at a movie theater illustrates an example of a physical event. Communicating directions to a hotel illustrates an example of an informational event.

Figure 3B:
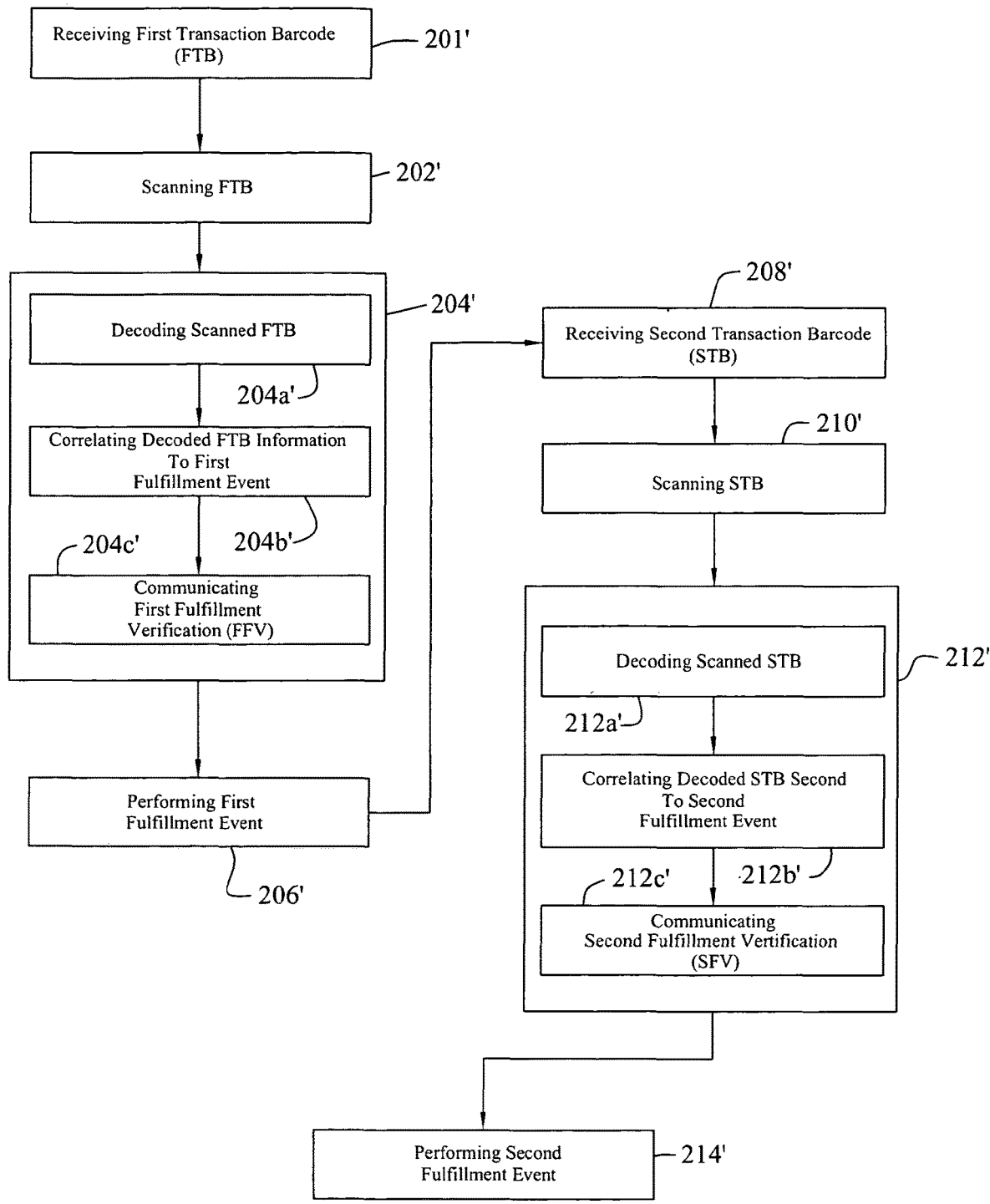
FIG. 3B is a flow chart illustrating an embodiment of a method for facilitating fulfillment of a wireless transaction, wherein transaction code verification is completed by a transaction fulfillment system.

Another embodiment of a method for performing the operation of facilitating wireless communication device enabled transaction fulfillment, the box 200 in FIG. 1, is illustrated in FIG. 3B. The method illustrated in FIG. 3B is best suited for being facilitated by a system in which verification of transaction codes is performed at the transaction fulfillment system. At a box 201', the FTB is received by the wireless communication device. At a box 202', the FTB is scanned from the wireless communication device. At a box 204', the FTB is verified. Verifying the FTB includes decoding the scanned FTB at a box 204*a'*, correlating the decoded FTB to a first transaction fulfillment event at a box 204*b'* and communicating a first fulfillment verification (FFV) to the transaction management system at a box 204*c*. Fulfillment verifications may be used by the transaction management system for coordinating operations, such as removing the requested transaction from a list of available transactions. At a box 206, the first transaction fulfillment event is performed.

At a box 208', a second transaction barcode (STB) is received by the wireless communication device. At a box 210', the STB is scanned from the wireless communication device. At a box 212, the STB is verified. Verifying the STB includes decoding the scanned STB at a box 212*a'*, correlating the decoded STB to a first transaction fulfillment event at a box 212*b'* and communicating a second fulfillment verification (SFV) to the transaction management system at a box 212*c'*. At a box 214', the second transaction fulfillment event is performed.

Figure 4:
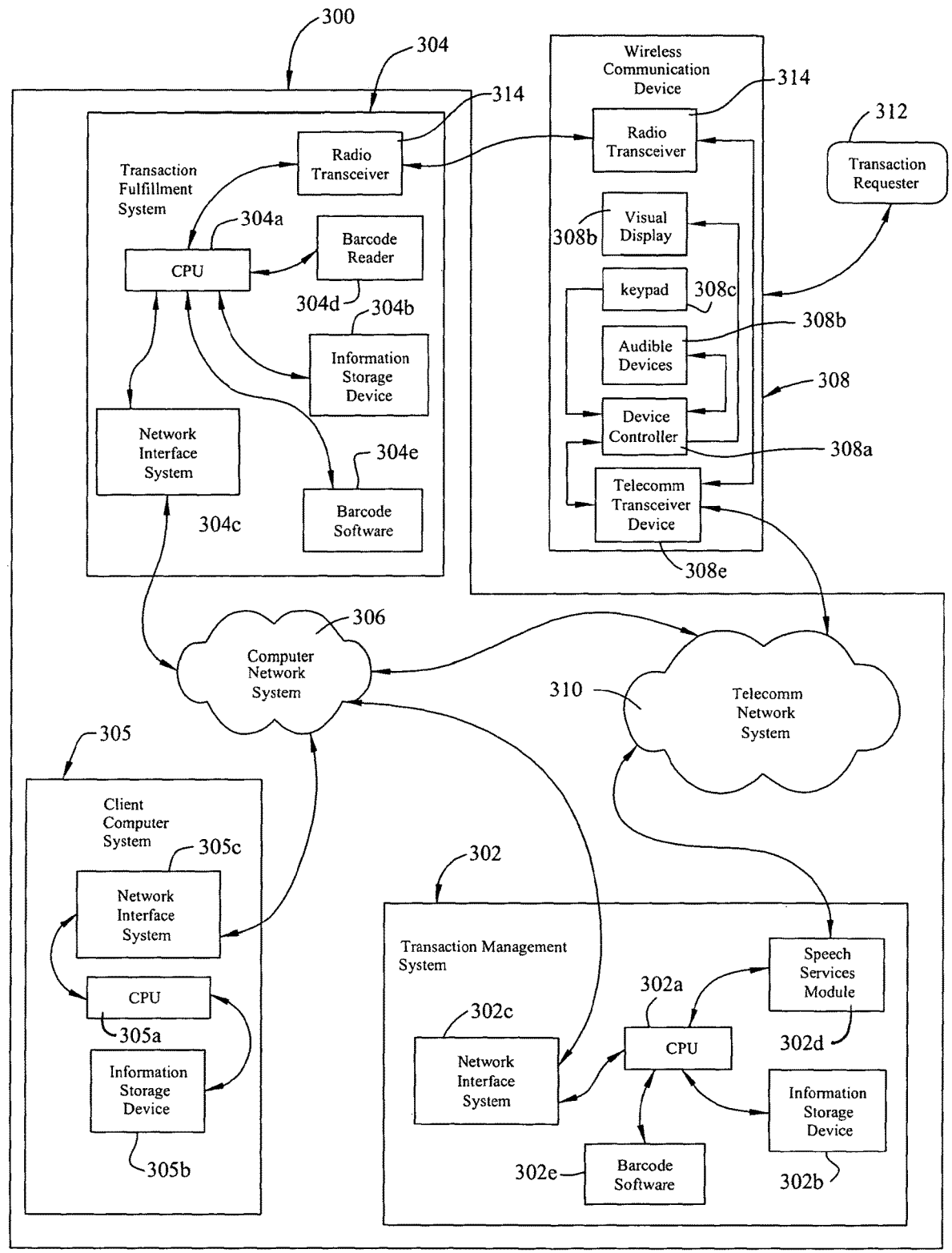
FIG. 4 is a block diagram illustrating an embodiment of a system for facilitating a wireless transaction using a telephonic-type wireless communication device.

An embodiment of a transaction apparatus 300 for carrying out the methods of FIGS. 1 3B using a telephonic type wireless communication device is illustrated in FIG. 4. The transaction apparatus 300 includes a transaction management system 302 coupled to a transaction fulfillment system 304 and a client system 305. It is also contemplated that in some applications it may be advantageous for the client computer system to be omitted from or discrete from the transaction apparatus 300. The transaction management system 302 is coupled to the transaction fulfillment system 304 through a computer network system 306. A wireless communication device 308 is coupled to the transaction management system 302 and to the transaction fulfillment system 304 through a telecommunications network system 310. A transaction requester 312 utilizes the wireless communication device 308 for communicating with the transaction management system 302 and the transaction fulfillment system 304.

A transport control protocol/Internet protocol (TCP/IP) computer network system illustrates an example of the computer network system 306. A suitable TCP/IP computer network system is a global computer network such as the Internet.

The telecommunications network system 310 includes a wireless telecommunications network and a wired telecommunications network. The telecommunication network system 310 enables communication of voice and data information to and from the transaction management system 302 and the transaction fulfillment system 304. The telecommunications networks of Sprint, AT&T, and Southwestern Bell illustrate examples of the telecommunication network system 310.

The transaction management system 302 includes a central processing unit (CPU) 302a, an information storage device 302b, a network interface system 302c, speech services module 302d and barcode software 302e. A network server or a workstation comprises the CPU 302a. A Dell PowerEdge™ series server illustrates an example of a suitable commercially available network server. A Dell Precision™ series workstation illustrates an example of a suitable commercially available workstation.

The information storage device 302b, such as a disk drive, is coupled to the CPU 302a for storing information in non-volatile memory. A Dell PowerVault™ series storage device illustrates an example of a suitable information storage device 302b. Fulfillment information, barcode information and authentic voice prints illustrate examples of information retrieved from the information storage device 302b.

The network interface system 302c is coupled to the CPU 302a for facilitating the communication of information between the transaction management system 302, the computer network system 306 and the wireless communication device 308. A suitable network interface system includes a router such as, for example, a Cisco Systems 7200 series unit coupled to a data service unit/channel service unit (hereinafter referred to as a DSU/CSU) such as, for example, an ADC Kentrox D-Serv™ series unit.

The speech services module 302d enables communication of voice signals between the wireless communication device 308 and the transaction management system 302. The speech services module 302d includes components such as hardware and software for enabling voice authentication.

Voice authentication is a desirable technique for verifying the identity of the transaction requester. Wireless communication devices are not well suited for entering alpha information. Spoken authentication codes can be effectively and conveniently communicated from a wireless communication device such as a wireless telephone. Accordingly, the use of voice authentication reduces the difficulty in submitting identity verification information.

Voice authentication technologies are commercially available from a number of sources. One example of a suitable voice authentication is Nuance Verifier 2.0 offered by Nuance Communications. Nuance Verifier is tightly integrated with Nuance 7.0 speech recognition software to ensure an exceptional level of user convenience and security. Users are recognized and authenticated simultaneously, shortening overall call duration, and eliminating the need for users to remember personal identification numbers and passwords.

The tight integration of voice authentication and speech recognition technologies enables Nuance Verifier 2.0 to take advantage of unique distributed architecture associated with the Nuance platform. This architecture supports simultaneous load balancing of speech recognition, natural language understanding, voice authentication, and text-to-speech resources. It ensures optimal usage of every server CPU in the network, thus minimizing the amount of hardware required, and the associated cost, for a given speech system.

SpeakEZ™ voice print speaker verification software offered by T-Netix Incorporated illustrates another example of voice authentication software. Smart Tone Technologies Incorporated offers proprietary software for enabling positive voice identification over wired and cellular telephones and in Internet applications. Both of these software offerings illustrate additional examples of voice authentication software that may be incorporated into the speech services module 302d.

The SpeakEZ voice print speaker verification functionality has been incorporated into a number of commercially available software development tool kits and interactive voice response (IVR) systems. These types of development tool kits and IVR systems are suitable for providing the transaction management system 302 with voice authentication functionality. Examples of commercially available software development tool kits and IVR systems incorporating SpeakEZ voice print speaker verification include the following. BioNetrix has integrated SpeakEZ voice print speaker verification into its BioNetrix Authentication Suite. Envoy Incorporated has integrated SpeakEZ voice print speaker verification into a number of its computer telephony development tool kits. IBM has integrated SpeakEZ voice print speaker verification into its DirectTalk/6000 and DirectTalk/2 IVR systems. Periphonics Corporation has integrated SpeakEZ voice print speaker verification into its VPS family of IVR systems.

The barcode software 302e enables encoding and decoding of barcodes. The barcode software 302e is accessible by the CPU 302a from a computer readable medium, such as a compact disk, disk drive or network connection. Commercially available barcode software from Omniplanar Incorporated, Peernet Incorporated and RVB Systems Group illustrate examples of the barcode software 302e.

The transaction fulfillment system 304 includes a central processing unit (CPU) 304a, an information storage device 304b, a network interface system 304c, a barcode reader 304d, and barcode software 304e. A network server or a workstation comprises the CPU 304a. A Dell PowerEdge™ series server illustrates an example of a suitable commercially available network server. A Dell Precision™ series workstation illustrates an example of a suitable commercially available workstation.

The information storage device 304b, such as a disk drive unit, is coupled to the CPU 304a for storing information in non-volatile memory. A Dell PowerVault™ series storage device is an example of a suitable information storage device 304b. Fulfillment reply information, product information, and barcode information illustrate examples of information that may be retrieved from the information storage device 304b.

The network interface system 304c is coupled to the CPU 304a for facilitating the communication of information between the transaction fulfillment system 304, the computer network system 306 and the wireless communication device 308. A router such as, for example, a Cisco Systems 7200 series unit coupled to a data service unit/channel service unit (hereinafter referred to as a DSU/CSU) such as, for example, an ADC Kentrox D-Serv™ series unit illustrates an example of the network interface system 304c. Depending on the volume of transaction requests fulfilled through the transaction fulfillment system 304, a network interface card ("NIC") and a modem illustrate two other examples of suitable network interface system 304c.

The bar code reader 304d enables transaction codes, such as barcodes, to be optically scanned and decoded. The barcode reader 304d is coupled to the CPU 304a for communicating a scanned representation of a barcode to the CPU 304a. Several commercially available barcodes are offered by Metrologic Incorporated. Metrologic offers a Fixed-mount Scanner under the Model No. S7001, and an in-counter scanner under the Model No. MS860.

The barcode software 302e enables encoding and decoding of barcodes. The barcode software 302e is accessible by the CPU 302a from a computer readable medium, such as a compact disk, disk drive or network connection. Barcode software that is commercially available from Omniplanar Incorporated, Peernet Incorporated and RVB Systems Group illustrate examples of the barcode software 302e.

The client computer system 305 is the system of the entity that offers the product or service requested in the transaction request. The client computer system 305 communicates with the transaction management system 302 and the transaction fulfillment system 304 to facilitate the transaction. The client system 305 includes a network interface a CPU 305a, an information storage device 305b and a network interface device 305c. The CPU 305a is coupled to the information storage device 305b for storing information, such as product and service information, in non-volatile memory. The network interface device 305c is coupled between the CPU 305a and the computer network system 306 for enabling communication there between.

The wireless communication device 308 includes a device controller 308a, audible devices 308b, a keypad 308c, a visual display 308d and a transceiver 308e. The device controller 308a is capable of controlling and integrating the operation of audible devices 308b, the keypad 308c, the visual display 308d and the transceiver 308e. The audible devices 308b, such as a microphone and a speaker, permit the transaction requester 312 to submit and hear spoken information. The keypad 308c permits the transaction requester 312 to submit keyed-in information. The visual display 308d permits the transaction requester 312 to view visual information being received by and communicated from the wireless communication device 308.

The transceiver 308e is capable of enabling the communication of voice and data information between the wireless communication device 308 and the telecommunications network system 310. In this manner, information is communicated to and from the transaction management system 302 and the transaction fulfillment system 304. In the embodiment of the system architecture illustrated in FIG. 4, voice and data information is communicated to and from the transaction management system 302, and only data information is communicated to and from the transaction fulfillment system.

Figure 5:
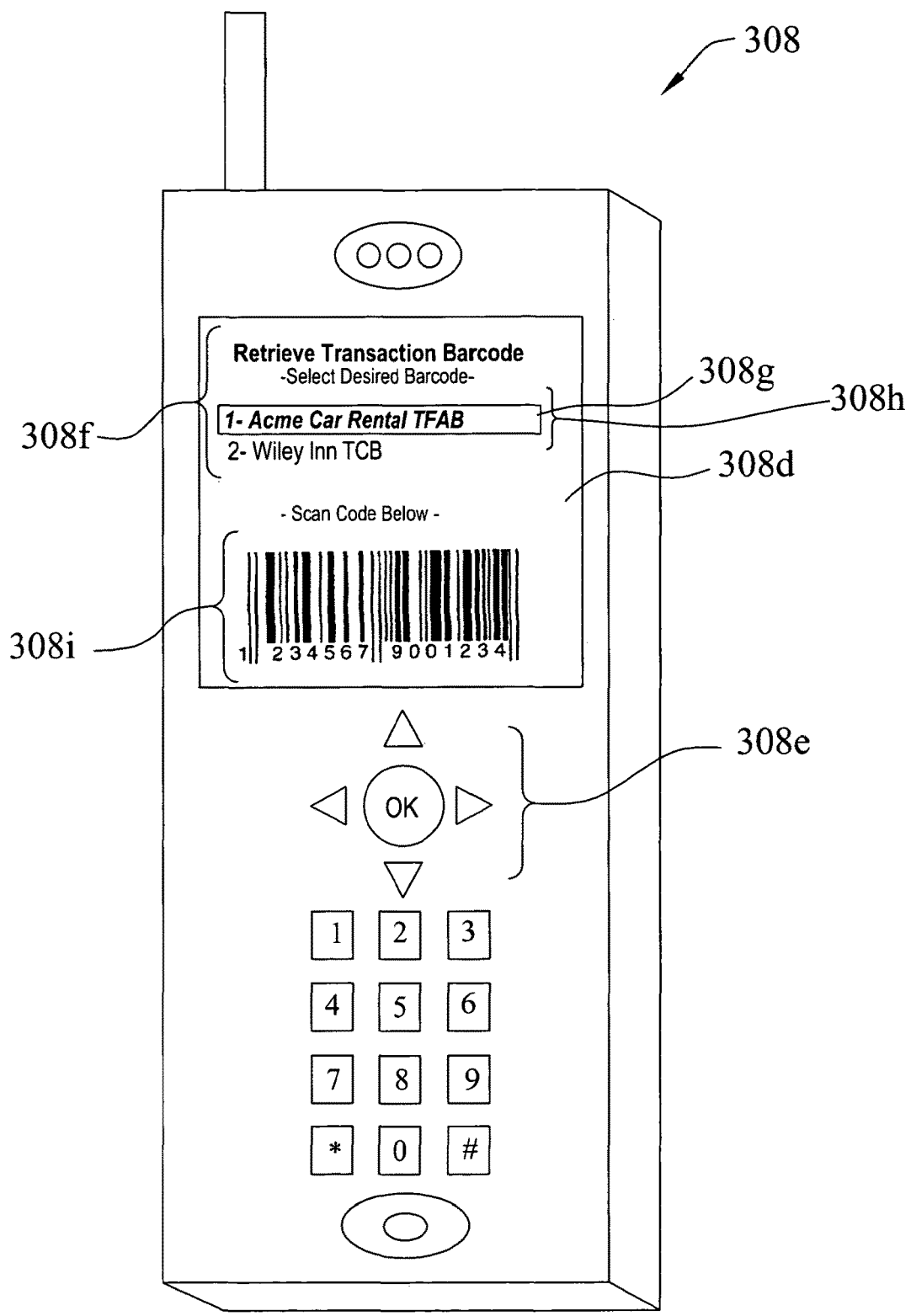
FIG. 5 is a diagrammatic view illustrating an embodiment of a telephonic-type wireless communication device.

As illustrated in FIG. 5, the wireless communication device 308 includes a scrolling device 308e. A user interface 308f is displayable on the visual display 308d of the wireless communication device 308. Using the scrolling device 308e, a desired transaction code name 308g is selected from a list of transaction code names 308h displayed on the visual display 308d. An optically scannable transaction code 308i is displayed on the visual display 308d in response to selecting the desired transaction code name 308g.

A wireless application protocol (WAP) enabled wireless telephone illustrates an example of the wireless communication device 308. In addition to WAP enabled wireless telephones and devices, wireless communication devices operating under other wireless protocols such as imode, sms and hdm1 may be utilized with the methods and systems disclosed herein. Wireless telephones capable of accessing computer networks, such as the Internet, are commercially available from several wireless telephone manufacturers.

The transaction apparatus 300 of FIG. 4 permits wireless transaction to be carried out by telephonic-type wireless communication devices, such as Internet enabled wireless telephones. However, by replacing the telecommunication network system with a wireless local area network system or adding a wireless local area network system to the transaction apparatus 300, the transaction apparatus 300 may be used for facilitating a wireless transaction using a non-telephonic Internet enabled telephonic communication device, such as a wireless PDA. When carrying out transaction requests with such a non-telephonic wireless communication device, authentication of the transaction requester may be more effectively achieved by known data password techniques rather than voice authentication.

The transaction apparatus 300, FIG. 4, is capable of enabling communication directly between a transaction fulfillment system 304 and a wireless communication device 308. To this end, the transaction fulfillment system 304 and the wireless communication device 308 each include a low power short range digital radio 314 integrated therein. Each digital radio 314 includes a radio transceiver for enabling voice and data information to be communicated between the transaction fulfillment system 304 and the wireless communication 308 without being communicated through the computer network system 306 or the telecommunication network system 310. The speed of information transfer between the transaction fulfillment system 304 and the wireless communication device 308 is significantly increased by eliminating the need to communicate such information through the computer network system 306 and the telecommunication network system 310.

A Bluetooth™ radio illustrates one example of the digital radio 314. Bluetooth radios are based on a radio specification governed by the Bluetooth Special Interest group. The specification defines the standards for a tiny microchip that comprise a radio transceiver. Accordingly, Bluetooth radios are built into digital devices, such as cellular telephones, PDA, portable computers, etc.

The Bluetooth radio makes communication of information nearly instant. It facilitates fast and secure transmissions of both voice and data, even when the devices are not within line-of-sight. The transceiver operates in a globally available frequency band, ensuring compatibility worldwide. The Ericsson R520 wireless telephone illustrates an example of a Bluetooth enabled wireless telephone. The R520 telephone is a triple mode phone with GPRS, Bluetooth radio, WAP capabilities.

A key aspect of the system and method embodiments disclosed herein is the ability and functionality associated with optically scanning transaction codes from the visual display of the wireless communication device. Optical scanning of transaction codes facilitates a convenient and secure technique for allowing fulfillment of real world products and services from a wireless transaction. The transaction requester must simply pass the visual display of the wireless communication device over the barcode reader of the transaction fulfillment system to act on fulfillment of the wireless transaction.

Many wireless communication devices, such as wireless telephones and wPDA's, have relatively small visual displays. As a result, optically scannable code communicated to the wireless communication devices must be relatively compact. One-dimensional barcodes and truncated two-dimensional barcodes illustrate examples of suitable barcodes for being communicated to devices having visual displays that are capable of displaying bitmap images. It is anticipated that over time most commercially available wireless communication devices will be capable of displaying larger barcodes, such as two-dimensional barcodes. One of the advantages of a two-dimensional barcode is the ability to embed several thousand bytes of information in the barcode.

Bar codes configured according to Code 128 Specification illustrate an example of a bar code configuration that is well suited for small visual displays of wireless telephones. Furthermore, most barcode readers in use today are capable of reading Code 128 barcodes. Code 128 barcodes are a very high-density alphanumeric symbology. The symbol can be as long as necessary to store the encoded data. It is designed to encode all 128 ASCII characters, and will use the least amount of space for data of 6 characters or more of any 1-D symbology. Each data character encoded in a Code 128 symbol is made up of 11 black or white modules. The stop character, however, is made up of 13 modules. Three bars and three spaces are formed out of these 11 modules. Bar and spaces can vary between 1 and 4 modules wide.

Presently, several commercially available wireless communication devices are not suitable capable of displaying bitmap images. A solution for communicating an optically scannable code to these types of wireless communication devices is to communicate a type of "hash code" to these of devices. One example of a hash code includes a string of forward slashes (/), representing a binary 1, and backward slashes (\), representing a binary 0. Suitable software would be required for decoding these types of code.

As illustrated in FIG. 4, the transaction management system (TMS) 302, transaction fulfillment system (TFS) 304, the client computer system (CCS) 305 and the wireless communication device (WCD) 308 are coupled in a manner for communicating information there between. In this embodiment, verification of the transaction barcodes and communication of the transaction barcodes are facilitated by the TMS 302. Furthermore, communication for determining the desired transaction is facilitated by the TMS 302.

Figure 6:
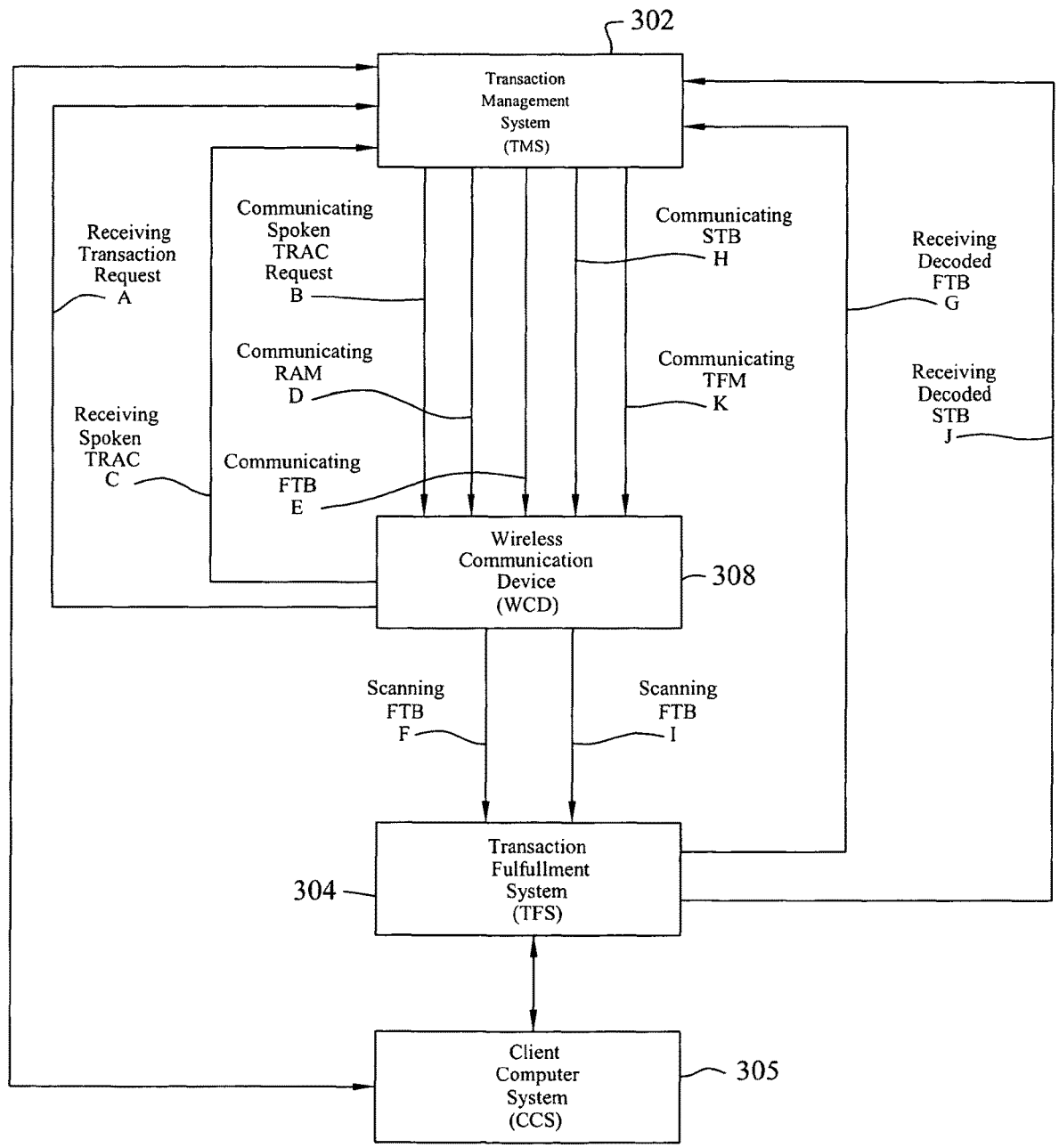
FIG. 6 is a block diagram illustrating an embodiment of operations for carrying out a wireless transaction using the system illustrated in FIG. 4.

Referring to FIG. 6, an operation A of receiving, at the TMS 302, a transaction request from the WCD 308 is performed. After receiving the transaction request, an operation B of communicating a request for a spoken transaction requester authentication code (TRAC) from the TMS 302 to the WCD 308 is performed. The request for the spoken TRAC is intended to initiate an operation C of receiving, at the TMS 302, a spoken TRAC from the WCD 308. An operation D of communicating a requester authentication message (RAM) from the TMS 302 to the WCD 308 initiates an operation E of communicating a first transaction barcode (FTB) to the WCD 308. The request authentication message confirms that the transaction request is approved and that the FTB has been communicated. The TFS 304 and the TMS 302 may interact with the CCS 305 to facilitate and enable fulfillment of the transaction request.

An operation F of scanning the FTB is performed after the operation E. In response to scanning the FTB, an operation G of receiving, at the TMS 302, a decoded representation of the FTB from the TFS 304 is performed. After receiving the decoded representation of the FTB and in response to the FTB being verified, an operation H of communicating a second transaction barcode (STB) from the TMS 302 to the WCD 308 is performed. A first fulfillment event is typically also performed in response to the FTB being verified. An operation I of scanning the STB is performed after the operation H. In response to scanning the STB, an operation J of receiving, at the TMS 302, a decoded representation of the STB from the TFS 304 is performed. After receiving the decoded representation of the STB and in response to the STB being verified, an operation K of communicating a transaction fulfillment message (TFM) from the TMS 302 to the WCD 308 is performed. A second fulfillment event is typically performed in response to the FTB being verified. Communication of the TFM may be part of the second fulfillment event.

After scanning and decoding the FTB and the STB, internal operations are conducted by the TFS 304, the TMS 304 or both. One such internal operation is communicating with a client computer system for enabling facilitation of the requested transaction. The TMS 302, the TFS 304 or both may use the fulfillment verification to initiate subsequent internal operations, such as removing a particular transaction offering from being available to transaction requesters.

The first and second transaction barcodes enables the transaction requester to act on fulfillment of the real world products or services requested in the transaction request. Renting and taking possession of a rental car using a cellular telephone represents a viable commercial implementation of the methods disclosed herein, the system illustrated in FIG. 4 and the operations described in reference to FIG. 7.

Example 1

Car Rental

A transaction requester who will be travel by plane to a different city uses his Internet enabled wireless telephone for renting a car for use during his trip. To this end, he contacts the TMS using his wireless telephone. He then interacts with a transaction requester user interface (TRUI) of his wireless telephone for communicating car rental information to and from car rental information from the TMS. The car rental information includes typical car rental information, such as rental dates, the type of car, etc. The TMS interacts with the OCS to complete the transaction request. For example, the TMS may interact with the OCS to determine whether the selected type of vehicle is available on the desired days. After he completes the transaction request, his identity is authenticated using voice authentication Techniques, such as those described herein.

After authenticating his identity, a FTB is communicated to his wireless telephone. When he arrives at the airport of the city he is traveling to, he accesses the TRUI for retrieving the FTB. He then passes the wireless telephone over one of many barcode readers of the TFS that are located throughout the airport. By doing so, the FTB is optically scanned from the visual display of his wireless telephone. By scanning the FTB, he has confirmed with the TFS that he has arrived at the airport and expects the car to be ready. After scanning the FTB, a STB is communicated to his wireless telephone.

He then makes his way to the car rental lot. Once at the car rental lot, he accesses the TRUI for retrieving the STB. After retrieving the STB, he optically scans the STB from the visual display of his wireless telephone using a barcode reader that is located at the car rental lot. By scanning the STB, he has confirmed with the TFS that he has arrived at the car rental lot and is ready to take possession of the rental car. After scanning the STB, a TFM may be communicated to his wireless telephone. In such an instance, the TFM includes information, such as direction to his hotel, information about the city, etc.

This example illustrates the convenience and time savings associated with using the methods and systems disclosed herein for renting a car when traveling. The advantages are especially significant to business travelers, as their schedules often change on short notice. However, the advantages associated with these methods and systems afford travelers of all types with a means of maintaining a tight travel schedule.

Figure 7:
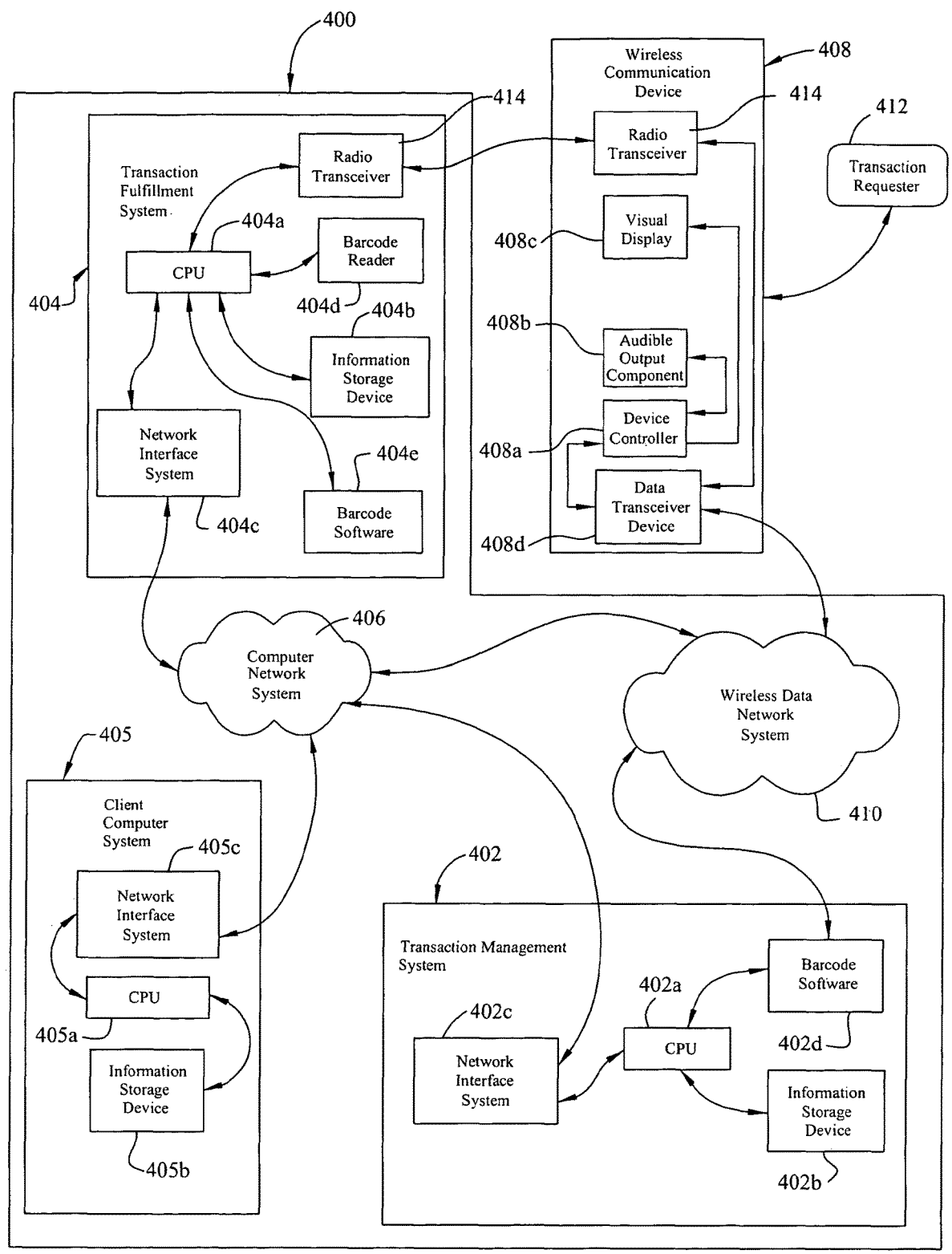
FIG. 7 is a block diagram illustrating an embodiment of a system for facilitating fulfillment of a wireless transaction using a non-telephonic type wireless communication device.

An embodiment of a transaction apparatus for carrying out the methods of FIGS. 1 3 using a non-telephonic wireless communication device is illustrated in FIG. 7. The transaction apparatus 400 includes a transaction fulfillment system 402 coupled to a transaction fulfillment system 404 and to a client computer system 405. It is also contemplated that in some applications it may be advantageous for the client computer system to be omitted from or discrete from the transaction apparatus 400. The transaction management system 402 is coupled to the transaction fulfillment system 404 through a computer network system 406.

A wireless communication device 408, such as a wireless personal digital assistant, communicates with the transaction management system 402 and the transaction fulfillment system 404 through a wireless data network system 410 and the computer network system 406. A transaction requester 412 utilizes the wireless communication device 408 for communicating with the transaction management system 402 and the transaction fulfillment system 404.

The wireless data network system 410 is a network system for providing wireless connectivity of non-telephonic wireless communication devices. The wireless data network system 410 may include a wireless local area network, a device specific wireless network or both. Examples of non-telephonic wireless communication devices include notebook computers including wireless modems and wireless PDA's.

The Cisco™ Aironet™ wireless local area network illustrates an example of the wireless local area network system 410. The Aironet wireless LAN system includes an Aironet 340 family of access points. The access point acts as a bridge integrate wireless functionality into a wired infrastructure. The Aironet wireless LAN system also includes an Aironet 340 Series family of client adapters. One example of a client adapter is an Aironet wireless data modem that plugs into a PCMCIA connector of a portable computer. The wireless data modem permits the portable computer to communicate with a network computer system such as the Internet via the Aironet 340 Series access point.

The PalmNet™ illustrates an example of a device specific wireless network. The PalmNet provides wireless connectivity of PDA's offered by Palm Computing Corporation. Through the PalmNet, users of Palm Computing PDA's can communicate information through a global computer network system such as the Internet.

The transaction management system 402 includes a central processing unit (CPU) 402a, an information storage device 402b, a network interface system 402c and barcode software 402d. A network server or a workstation, such as those identified above in reference to FIG. 4, comprise the CPU 402a. The information storage device 402b, such as that identified above in reference to FIG. 4, is coupled to the CPU 402a for storing information in non-volatile memory. Fulfillment information, barcode information and transaction requester passwords illustrate examples of information that may be retrieved from information storage device 402b.

The network interface system 402c, such as that identified above in reference to FIG. 4, is coupled to the CPU 402a for facilitating the communication of information between the transaction management system 402, the computer network system 406 and the wireless communication device 408. The barcode software 402d, such as that indicated above in reference to FIG. 4, enables encoding and decoding of barcodes. The barcode software 402d is accessible by the CPU 402a from a computer readable medium, such as a compact disk, disk drive or network connection.

The transaction fulfillment system 404 includes a central processing unit (CPU) 404a, an information storage device 404b, a network interface system 404c, a barcode reader 404d, and barcode software 404e. The transaction fulfillment system 404 includes a central processing unit (CPU) 404a. A network server or workstation, such as those identified above in reference to FIG. 4, comprise the CPU 404a. The information storage device 404b, such as that identified above in reference to FIG. 4, is coupled to the CPU 404a for storing information in non-volatile memory. Fulfillment reply information, transaction codes, product information, and barcode information illustrate examples of information that may be retrieved from the information storage device 404b.

The network interface system 404c, such as that identified above in reference to FIG. 4, is coupled to the CPU 404a for facilitating the communication of information between the transaction fulfillment system 404, the computer network system 406 and the wireless communication device 408. The bar code reader 404d, such as that identified above in reference to FIG. 4, enables barcodes to be optically scanned and decoded. The barcode reader 404d is coupled to the CPU 404a for communicating a scanned representation of a barcode to the CPU 404a.

The barcode software 404e, such as that identified above in reference to FIG. 4, enables the encoding and decoding of barcodes. The barcode software 404e is accessible by the CPU 402a from a computer readable medium, such as a compact disk, disk drive or network connection.

The client system 405 is the system of the entity that offers the product or service requested in the transaction request. The client computer system 405 communicates with the transaction management system 402 and the transaction fulfillment system 404 to facilitate the transaction. The client system 405 includes a network interface a CPU 405a, an information storage device 405b and a network interface device 405c. The CPU 405a is coupled to the information storage device 405b for storing information, such as product and service information, in non-volatile memory. The network interface device is coupled between the CPU 405a and the computer network system 406 for enabling communication there between.

The wireless communication device 408 includes a device controller 404a, an audible output component 404b, a touch screen-type visual display 404c and a data transceiver 404d. The device controller is capable of controlling and integrating the operation of the audible output component 404b, the touch screen-type visual display 404c and the data transceiver 404d. The audible output component 404b, such as a speaker, permits the transaction requester to hear spoken information. The touch screen type visual display 404c permits the transaction requester 412 to input information by touching the visual display 404c, by writing on the visual display 404c or both.

The data transceiver 404d is capable of enabling the communication of data information between the wireless communication device 308, the transaction management system 402 and the transaction fulfillment system 404. The transceiver may also be capable of communicating voice information between the wireless communication device 308 and the wireless local area network system 410. In this manner, information is communicated between the wireless communication device 408, the transaction management system 402 and the transaction fulfillment system 404.

Figure 8:
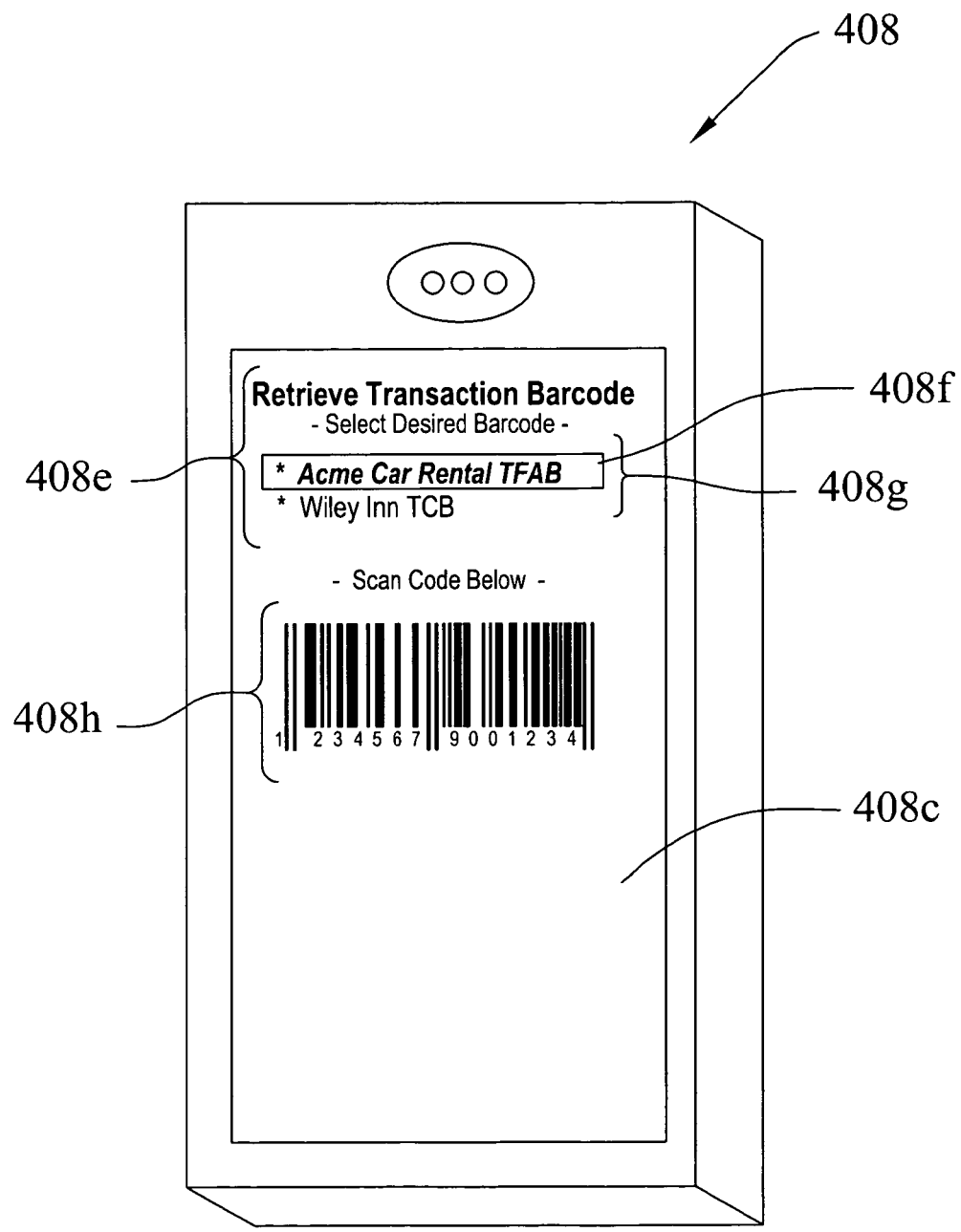
FIG. 8 is a diagrammatic view illustrating an embodiment of a non-telephonic type wireless communication device.

As illustrated in FIG. 8, the visual display 404c of the wireless communication device 308 includes a touch screen type visual display. A user interface 404e is displayable on the visual display 404c of the wireless communication device 408. Using a suitable physical pointing device, a desired transaction code name 404f is selected from a list of transaction code names 404g displayed on the visual display 404c. An optically scannable transaction code 404h is displayed on the visual display 404c in response to selecting the desired transaction code name 404f. A wireless personal digital assistant illustrates an example of the wireless communication device 408.

Figure 9:
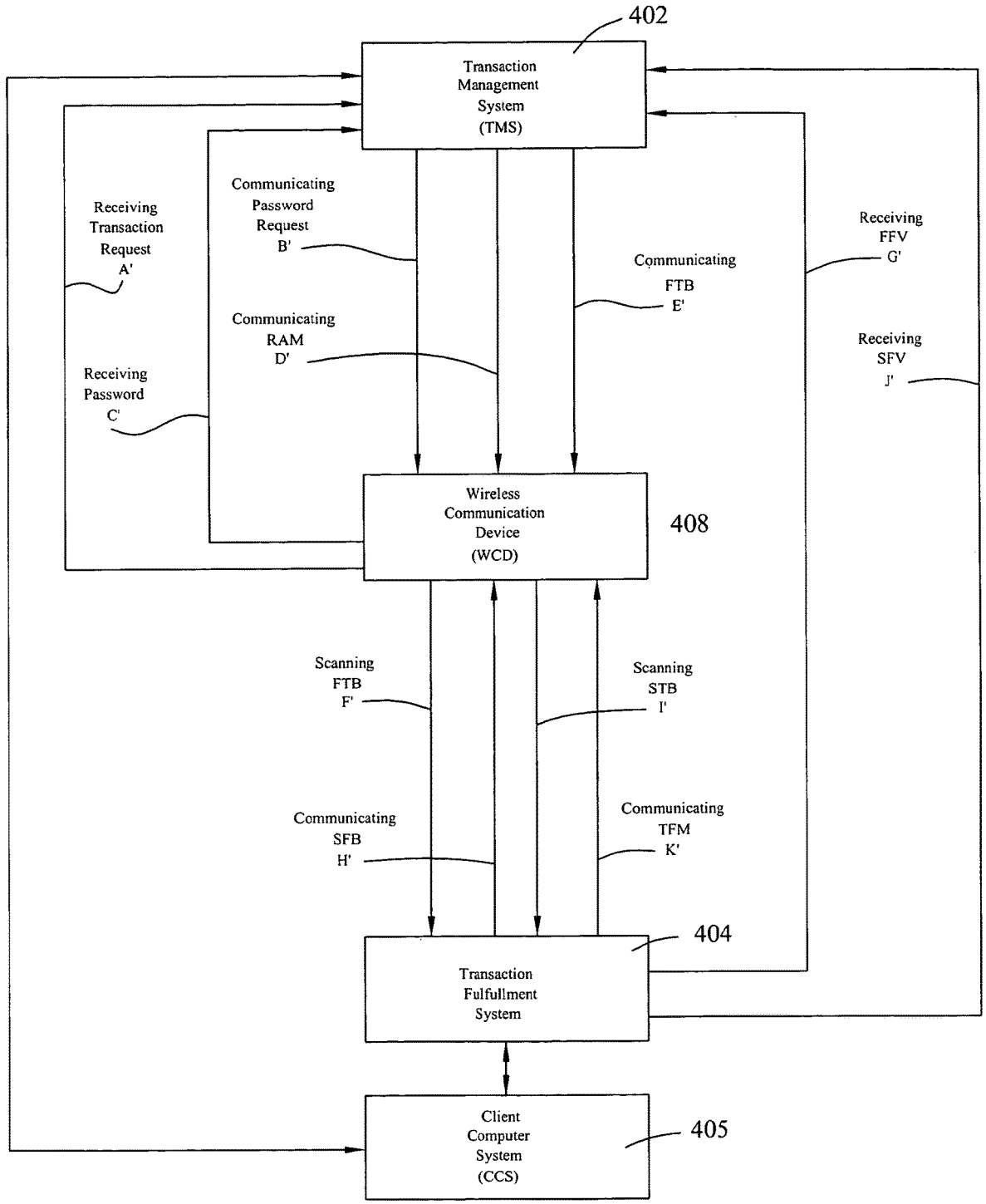
FIG. 9 is a block diagram illustrating an embodiment of operations for carrying out a wireless transaction using the system illustrated in FIG. 7.

As illustrated in FIG. 7, the transaction management system (TMS) 402, transaction fulfillment system (TFS) 404, the client computer system (CCS) 405 and the wireless communication device (WCD) 408 are coupled in a manner for communicating information therebetween. In this embodiment, verification of the transaction barcodes and communication of the transaction barcodes are facilitated by the TFS 404. Communication for determining the desired transaction is facilitated by the TMS 402. Referring to FIG. 9, an operation A' of receiving, at the TMS 402, a transaction request from the WCD 408 is performed. After receiving the transaction request, an operation B' of communicating a request for a password from the TMS 402 to the WCD 408 is performed. The request for the password is intended to initiate an operation C' of receiving, at the TMS 402, a password from the WCD 408. An operation D' of communicating a requester authentication message (RAM) from the TMS 402 to the WCD 408 initiates an operation E' of communicating a first transaction barcode (FTB) to the WCD 408. The RAM confirms that the transaction request is approved and that the FTB has been communicated. The TFS 404 and the TMS 402 may interact with the CCS 405 to facilitate and enable fulfillment of the transaction request. The FTB is used by the transaction requester to act on fulfillment of the real world products or services requested in the transaction request. The TFS 404 and the TMS 402 may interact with the CCS 405 to facilitate and enable fulfillment of the transaction request.

An operation F' of scanning the FTB is performed after the operation E'. In response to performing the operation F', a decoded representation of the FTB is generated at the TFS 404. After scanning and decoding the FTB and in response to the STB being verified, an operation G' of receiving, at the TMS 402, a first fulfillment verification (FFV) from the TFS 404 is performed. A first fulfillment event is typically also performed in response to the FTB being verified. The TMS 302, the TFS 304 or both may use such verification to initiate subsequent internal operations, such as removing a particular transaction offering from being selectable by the transaction requester.

After scanning the FTB, an operation H' of communicating a second transaction barcode (STB) from the TFS 404 to the WCD 408 is performed. An operation I' of scanning the STB is performed after the operation H'. In response to scanning the STB, a decoded representation of the STB is generated at the TFS 404. After the STB is scanned and in response to the STB being verified, an operation J' of receiving, at the TMS 402, a second fulfillment verification (SFV) from the TFS 404 is performed. A second fulfillment event is typically also performed in response to the STB being verified.

The first and second fulfillment verifications illustrate an example of fulfillment verifications. Such verifications from the TFS 404 notify the TMS 402 that the transaction has been initiated or completed. After the STB is scanned, an operation K' of communicating a transaction fulfillment message (TFM) from the TFS 402 to the WCD 408 is performed.

Example 2

Movie Theater

A transaction requester uses her wireless PDA to purchase a ticket to a desired movie while on her way to the theater. To this end, she contacts the TMS using her wireless PDA. She then interacts with a transaction requester user interface (TRUI) of her PDA for communicating movie information to and receiving movie information from the TMS. The movie information includes typical movie information such as the name of the movie and the time of the movie. The TMS interacts with the OCS to complete the transaction request. For example, the TMS may interact with the OCS to determine whether seats are remaining for the desired movie at a desired time. After completing the transaction request, her identity is authenticated in response to her keying in her password.

After authenticating her identity, a FTB is communicated to her PDA. When she arrives at the theater, she accesses the TRUI for retrieving the FTB. She then passes the PDA over a barcode reader that is located at the entrance of the theater. In this manner, the FTB is optically scanned from the visual display of her PDA. Scanning the FTB activates a first turnstile allowing her to gain entry into the lobby of the theater. In some instances, it may also activate a ticket dispenser in the turnstile to dispense a physical ticket for the specified movie. After scanning the FTB, a STB is communicated to her PDA.

She then makes her way toward the auditorium portion of the theater. To gain access to the auditorium portion of the theater, she retrieves the STB. After retrieving the STB, she passes the PDA over a barcode reader that is located at the entrance of the auditorium portion of the theater. Scanning the STB activates a second turnstile allowing her to gain access to the auditorium portion of the theater. After scanning the STB, a transaction fulfillment message is sent to her PDA. The transaction fulfillment message includes information such as directions to the particular auditorium her movie is in, interactive or exclusive information about the movie, etc.

This example illustrates the convenience and time savings associated with using the methods and systems disclosed herein for attending a movie. In this example, the advantages associated with these methods and systems are even more pronounced during times of high traffic at movie theaters.

Figure 10:
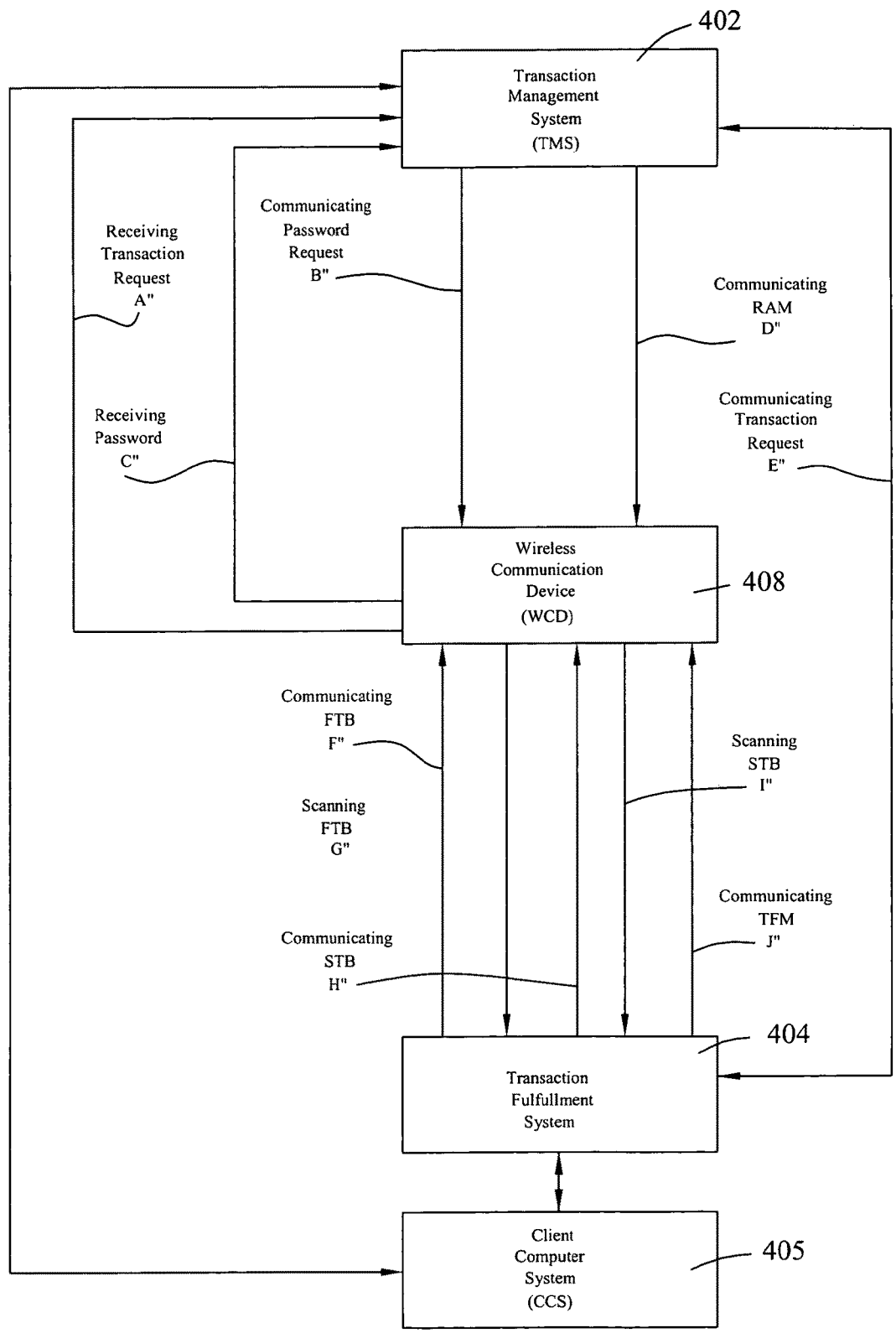
FIG. 10 is a block diagram illustrating another embodiment of operations for carrying out a wireless transaction using the system illustrated in FIG. 7.

FIG. 10 illustrates another embodiment of an operation flowchart for the system illustrated in FIG. 7. In this embodiment verification of the transaction barcodes, communication of the transaction barcodes and communication for determining the desired transaction is facilitated by the TFS 404. An operation A″ of receiving, at the TMS 402, a transaction request from the WCD 408 is performed. After receiving the transaction request, an operation B″ of communicating a request for a password from the TMS 402 to the WCD 408 is performed. The request for the password is intended to initiate an operation C″ of receiving, at the TMS 402, a password from the WCD 408. An operation D″ of communicating a requester authentication message (RAM) from the TMS 402 to the WCD 408 initiates an operation E″ of communicating the transaction request from the TMS 402 to the TFS 404. The RAM confirms that the password is approved. In this embodiment, the transaction request is communicated to the TFS 404 for enabling fulfillment of the transaction request by the TFS 404. The TFS 404 and the TMS 402 may interact with the CCS 405 to facilitate and enable fulfillment of the transaction request.

An operation F″ of communicating a FTB from the TFS 404 to the WCD 408 is performed after the TFS 404 receives the transaction request. The FTB is used by the transaction requester to act on fulfillment of the real world products or services requested in the transaction request. An operation G″ of scanning the FTB is performed after the operation F″. In response to performing the operation G″, a decoded representation of the FTB is generated at the TFS 404 and a first fulfillment verification operation is completed by the TFS 404.

After verifying the FTB, an operation H″ of communicating a second transaction barcode (STB) from the TFS 404 to the WCD 408 is performed. An operation I″ of scanning the STB is performed after the operation H″. In response to scanning the STB, a decoded representation of the STB is generated at the TFS 404 and a second fulfillment verification operation is completed by the TFS 404. In response to verifying the STB, an operation J″ of communicating a transaction fulfillment message (TFM) from the TFS 402 to the WCD 408 is performed.

A multiple stage transaction method including the communication of two transaction codes is disclosed herein. It is contemplated and expected that the methods disclosed herein may be implemented in a manner in which a one stage transaction method or a multiple stage transaction method having three stages or more is provided. For example, in some applications, it will be advantageous to utilize a one stage transaction method in which only one transaction code, such as the first transaction code discussed herein, is communicated to the wireless communication device. It will be understood that the number of transaction codes communicated to the wireless communication device is dependent on the specific application, rather than being definitive of the systems and methods disclosed herein.

Commercial implementation of the methods and systems described herein may be accomplished in conjunction with one of many open or proprietary global specification that enables wireless communication device users to easily access and interact with information and services through the computer network systems described herein. One example of such an open global specification is the Wireless Application Protocol (WAP). WAP is designed to work with most wireless device architectures such as CDPD, CDMA, GSM, PDC, PHS, TDMA, FLEX, ReFLEX, iDEN, TETRA, DECT, DataTAC, Mobitex. Examples of WAP enabled wireless phones include the phone offered by Nokia under the model number 7110, the phone offered by Siemens under the model number S25, and the phone offered by Ericsson under the model number R380. Examples of WAP enabled wireless PDA's include the PDA offered by 3Com under the tradename PalmPilot VII and the PDA offered by Ericsson under the model number MC218.

WAP is a communications protocol and application environment. WAP technology can be included in the operating system of most wireless communication devices, including PalmOS, EPOC, Windows CE, FLEXOS, OS/9, JavaOS etc. It provides service interoperability even between different device families. Additional details regarding the WAP can be obtained from the Wireless Application Protocol Forum Ltd. (www.wapforum.org) and from Dynamical Systems Research Ltd. (www.wap.net).

Symbian (www.symbian.com) offers a technology and hardware system under the tradename EPOC that provides a complete solution for manufacturers of wire communication devices. EPOC Release 5 includes Symbian's entire technology platform for bringing EPOC and other technology of Symbian into the heart of the wireless industry. This includes technologies for supporting integrated Internet e-mail, wireless text messaging, contacts database and schedule, Internet-standard web browser, synchronization between EPOC-based and PC-based personal information and document formats, and a high-performance implementation of a wireless application language offered by Sun Microsystems under the tradename Java. EPOC provides robustness, compactness and performance that are delivered through careful system design in programming languages including C++.

WAP gateways are applications capable of enabling Internet content to be delivered to wireless communication devices. WAP gateways include the gateways offered by Opensource, Ericsson, Apion, Mobileways, Nokia, Unwired Planet, and Edgemail.

Dynamical Systems Research offers the WAP Developer's Toolkit (WDT). WDT supports the development of WAP applications. WAP applications use Wireless Mark-Up Language (WML) and Wireless Mark-Up Language Script (WML Script). WML's are used to create WAP pages in a manner similar to how HTML is used to create web pages for the Internet/World Wide Web. WMLScript is a script language for creating and laying out actual page content.

Phone.com offers UP.SDK, a freely available software development kit accessible at www.phone.com/products/upsdk.html, that enables Web developers to quickly and easily create HDML and WML information services and applications. UP.SDK includes a software development tool referred to as the UP.Simulator that accurately simulates the behavior of an UP.Browser-enabled device. The simulator can run applications in local mode or connect to an UP.Link so developers can test the complete set of UP.Link-enabled services. Phone.com also provides a publicly available UP.Link for all developers to use freely so that they can create complete applications without the need for a handset or expensive carrier infrastructure. UP.SDK tools can be run on either Windows '95 or Windows NT (Windows 95 and Windows NT are tradenames of Microsoft Corporation).

In the preceding detailed description, reference has been made to the accompanying drawings which form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical, chemical and electrical changes may be made without departing from the spirit or scope of the invention. For example, functional blocks shown in the figures could be further combined or divided in any manner without departing from the spirit of scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

The invention claimed is:

1. A method for facilitating a wireless transaction, comprising:
    receiving, at a transaction system and at least in part over a wireless communication link, a transaction request for a user-selected wireless transaction, the transaction request associated with a wireless transaction comprising an authorization with respect to a product or service, and a fulfillment event associated with the authorization, the fulfillment event occurring at a fulfillment location;
    in response to the received user-selected transaction request, determining whether the authorization has been obtained;
    if the authorization has been obtained, communicating a transaction code from the transaction system to a wireless communication device, the transaction code that, at a first point in time, is capable of being received from the wireless communication device at the fulfillment location over a low power, short-range, digital radio link to partially complete the wireless transaction; and
    at a second point in time and while the wireless transaction remains only partially complete, completing the wireless transaction at the fulfillment location by substeps consisting essentially of receiving a transaction code from the wireless communication device over the low power, short-range, digital radio link, and removing from an inventory of the transaction system a transaction offering for the product or service associated with the completed wireless transaction such that the product or service is not available for purchase by a second user in a subsequent wireless transaction initiated by the second user.

2. The method as described in claim 1 wherein the low power, short-range, digital radio link is a short-range wireless radio link.

3. The method as described in claim 2 wherein the short-range wireless radio link is Bluetooth.

4. The method as described in claim 1 further including authenticating a user of the wireless communication device prior to seeking the authorization for the user-selected transaction request.

5. The method of claim 1 wherein the transaction code communicated from the transaction system is the same transaction code received from the wireless communication device.

6. The method of claim 1 wherein the transaction code communicated from the transaction system differs from the transaction code received from the wireless communication device.

* * * * *